Sept. 15, 1931.  R. O. HENDRICKSON  1,823,141
CURTAIN DEVICE FOR RADIATORS
Filed March 31, 1930
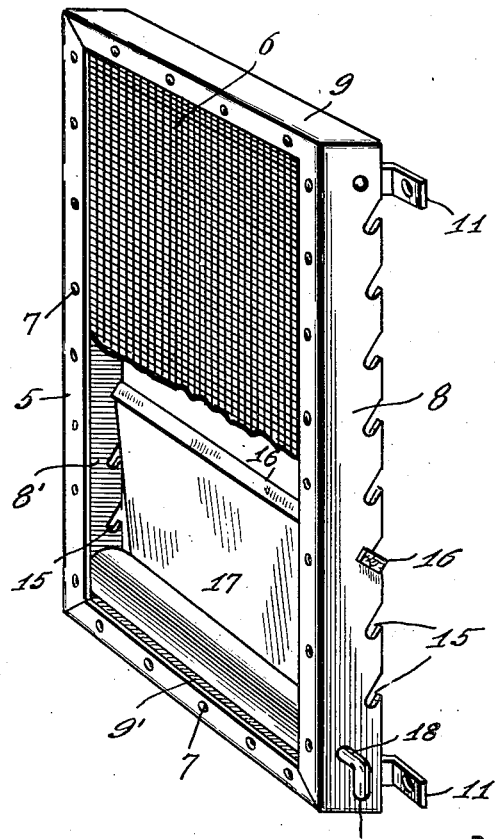
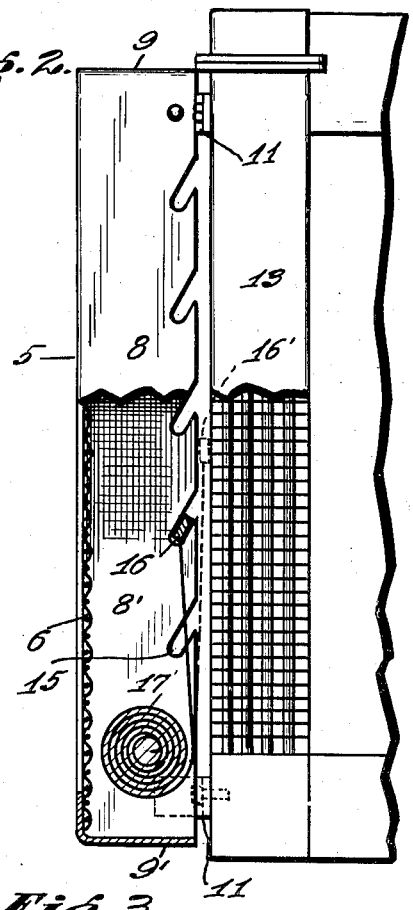
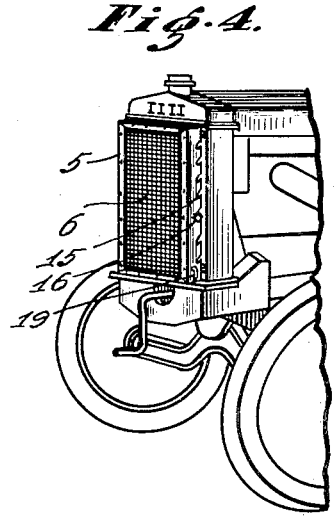
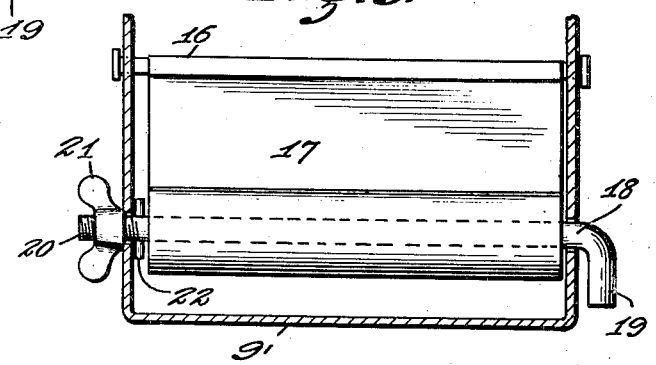
Inventor
Robert O. Hendrickson,
By James A. Walsh,
Attorney Patented Sept. 15, 1931

1,823,141

UNITED STATES PATENT OFFICE

ROBERT O. HENDRICKSON, OF RACINE, WISCONSIN, ASSIGNOR TO J. I. CASE COMPANY, OF RACINE, WISCONSIN, A CORPORATION

CURTAIN DEVICE FOR RADIATORS

Application filed March 31, 1930. Serial No. 440,489.

My invention relates to a combined screen and adjustable curtain adapted to be secured as a unit to a radiator forming part of a tractor or other vehicle, the screen being provided on the front side thereof to prevent entrance into the radiator core of insects, chaff, weed seeds and other particles floating in the air during field operations, which clog the air cooling passages of the radiator core, while the curtain is employed for controlling the temperature of the tractor motor, which is accomplished by covering a portion of the core with the curtain, the area to be covered depending upon the atmospheric temperature and the load or pull to which the tractor is subjected, and which curtain is commonly adjusted to suit conditions as the temperature of the motor varies; my object being to provide a combination screen and curtain in a compact unit, of simple and economical manufacture, and detachably connected to a tractor radiator to be readily secured and removed therefrom.

In the accompanying drawings, forming part hereof, Figure 1 is a perspective of my improved combined screen and adjustable curtain; Fig. 2, a side elevation partly in section showing the relation of my improvement as attached to a radiator; Fig. 3, a detail showing the curtain partially unwound and maintained in predetermined relation to the radiator; and Fig. 4 is a fragmentary perspective of a tractor with my improvement applied to the radiator.

In said drawings the numeral 5 indicates the frame to which the screen 6 is secured by rivets 7 or otherwise, said frame comprising vertical and horizontal members 8, 8', and 9, 9', respectively, preferably of light sheet metal, and provided with brackets 11 by which they may be readily detachably connected to a radiator 13 by suitable means, such as screws or bolts. The vertical members 8, 8', are provided with notches 15 constituting hangers for sustaining a transverse bar 16 to which the free end of a curtain 17 is attached, the lower portion of said curtain being secured to a rod or roller 18 and wound thereabout, at 17', as shown in Fig. 2. The rod 18, as shown in Fig. 3, is mounted in the vertical walls 8, 8', of the frame, and has one of its ends 19 cranked to form a handle, its opposite end 20 being screw-threaded and provided with a wing-nut 21 by which the rod 18 may be set or engaged in fixed position in the frame, and which rod has a pin 22 or other stop associated therewith by which it may be immovably held against rotation when the nut 21 has been tightened.

As indicated in Figs. 2 and 4 of the drawing, when the frame 5 has been attached to the radiator the curtain 17 is positioned between the screen 6 and the radiator 13, and, as shown in Fig. 2, said frame is sufficiently spaced from the radiator to enable an attendant to insert his hand therebetween for adjusting said curtain. When adjusting the curtain the nut 21 is turned away from the frame member and the rod 18 is then free to rotate, whereupon the bar 16 may be lifted or lowered and inserted in the desired hangers 15 to draw the curtain over the radiator core to cover the area thereof not to be exposed. The curtain, which is made of canvas or other suitable material, is then drawn taut by turning rod 18 in a clockwise direction by manipulating its handle 19, and when thus drawn sufficiently taut the wing-nut 21 is turned tightly against the frame member and pulls the stop 22 against the inner side thereof, which stop prevents the rod from turning until again released by loosening the nut when it is desired to readjust the curtain. As will be understood, and as indicated by the dotted lines 16', the bar 16 can be moved from one pair of oppositely alined notches to another without binding between the core and the frame, so that I am enabled to readily arrange the bar and thereby adjust the curtain to the desired height; and while I have specifically described the frame 5 as being secured to the radiator by brackets I desire it to be understood that where desirable said frame may be hinged so as to be swung away from the radiator when adjusting the curtain or otherwise.

I claim as my invention:—

1. In a device of the character described, a frame embodying vertical members having notches therein, a roller mounted in the frame, a curtain secured to the roller adapted to be lengthened or shortened in height in relation to the roller, means for locking the roller in fixed position when the curtain has been adjusted to predetermined heights, and means associated with the free end of the curtain and adapted to engage said notches for maintaining the curtain in extended position.

2. In a device of the character described, a frame, a roller therein having a handle, means for securing the roller against rotation, a curtain wound about said roller and adapted to be lengthened and shortened thereby, and means for securing the curtain to the frame at predetermined heights in relation to the roller.

In testimony whereof I affix my signature.

ROBERT O. HENDRICKSON.